United States Patent [19]
Feth et al.

[11] Patent Number: 6,139,196
[45] Date of Patent: Oct. 31, 2000

[54] METHOD OF PREPARING OPTICAL FIBER FOR FUSION SPLICING AND METHOD OF FORMING A FUSION SPLICE

[75] Inventors: John R. Feth, Phoenix; Richard L. Niemeyer, Peoria, both of Ariz.

[73] Assignee: Honeywell, Inc., Morristown, N.J.

[21] Appl. No.: 09/189,380

[22] Filed: Nov. 9, 1998

[51] Int. Cl.[7] .................................................. G02B 6/255
[52] U.S. Cl. .................................. 385/97; 385/96; 385/98
[58] Field of Search .................................... 385/95, 96, 97

[56] References Cited

U.S. PATENT DOCUMENTS

| | | |
|---|---|---|
| 4,319,902 | 3/1982 | Hensel . |
| 4,537,466 | 8/1985 | Moisson et al. . |
| 4,623,156 | 11/1986 | Moisson et al. . |
| 4,950,318 | 8/1990 | Dyott . |
| 4,971,418 | 11/1990 | Dorsey et al. . |
| 5,002,351 | 3/1991 | Szanto et al. . |
| 5,009,513 | 4/1991 | Onodera et al. ................ 374/31 |
| 5,016,971 | 5/1991 | Hsu et al. . |
| 5,245,400 | 9/1993 | Anjan et al. . |
| 5,257,337 | 10/1993 | Grigsby et al. ................. 385/96 |
| 5,299,274 | 3/1994 | Wysocki et al. . |
| 5,323,225 | 6/1994 | Dyott . |
| 5,339,380 | 8/1994 | Wysocki et al. . |
| 5,340,371 | 8/1994 | Dyott . |
| 5,437,000 | 7/1995 | Dyott . |
| 5,487,125 | 1/1996 | Kammlott et al. . |
| 5,588,082 | 12/1996 | Whitesmith ....................... 385/96 |

FOREIGN PATENT DOCUMENTS

| | | |
|---|---|---|
| 2 538 916 | 7/1984 | France . |
| 37 18402 A1 | 12/1988 | Germany . |
| 41 40 087 A1 | 6/1993 | Germany . |
| 295 10 705 U1 | 10/1995 | Germany . |
| 57-169702 | 10/1982 | Japan . |
| 04324403 | 9/1992 | Japan . |
| 05333227 | 12/1993 | Japan . |

*Primary Examiner*—Frank G. Font
*Assistant Examiner*—Roy M. Punnoose
*Attorney, Agent, or Firm*—Kris T. Fredrick

[57] ABSTRACT

A method of preparing an optical fiber for fusion splicing comprising the steps of providing an optical fiber having a fiber jacket and an end, removing a predetermined bulk of the fiber jacket from an area adjacent the end while one of substantially simultaneously moving gas over the area and exhausting gas from the area.

29 Claims, 4 Drawing Sheets

METHOD OF PREPARING OPTICAL FIBER FOR FUSION SPLICING AND METHOD OF FORMING A FUSION SPLICE

TECHNICAL FIELD

This invention relates generally to the field of optical fiber technology and, more particularly, to a method of preparing optical fiber for fusion splicing and a method of forming a fusion splice.

BACKGROUND ART

Optical fibers used in sensors and other optical circuits that use concatenated segments require stable alignments between the segments to ensure and maintain exemplary circuit performance. Fusion splicing, a controlled heating and joining of the segment ends, provides this stability in the x, y, and z dimensions and in rotational azimuth around the fiber axis.

Preparation for fusion splicing currently involves the use of mechanical or chemical methods to strip the protective jacket from the end of each optical fiber segment, and to clean the stripped optical fiber ends of residue in preparation for forming a smooth surface, such as with a mechanical cleave, at each optical fiber segment. The foregoing operation is not only tedious, time consuming and substantially normally carried out only by hand, but can also occasion damage to the optical fiber segments which can materially reduce the quality and lifetime of the fusion splice.

Accordingly, it would be highly desirable to provide an improved method of preparing optical fiber for fusion splicing.

It is a purpose of the present invention to provide a new and improved method of preparing optical fiber for fusion splicing that is easy to implement.

It is another purpose of the present invention to provide a new and improved method of preparing optical fiber for fusion splicing that is reliable.

It is still another purpose of the present invention to provide a new and improved method of preparing optical fiber for fusion splicing that produces a high quality, rugged and long-lasting fusion splice.

It is a further purpose of the present invention to provide a new and improved method of preparing optical fiber for fusion splicing that is efficient and inexpensive.

It is still a further purpose of the present invention to provide a new and improved method of preparing optical fiber for fusion splicing that substantially eliminates optical fiber contamination.

It is yet still a further purpose of the present invention to provide a new and improved method of fusion splicing segments of optical fiber.

It is another purpose of the present invention to provide a new and improved method of forming a fusion splice.

It is yet another purpose of the present invention to provide a new and improved method of forming a fusion splice that utilizes no touch labor.

DISCLOSURE OF THE INVENTION

The above problems and others are at least partially solved and the above purposes and others are realized in a new and improved method of preparing optical fiber for fusion splicing, a new and improved method of fusion splicing segments of optical fiber and a new and improved method of forming a fusion splice.

In a specific embodiment, an exemplary method of preparing an optical fiber for fusion splicing may generally comprise the steps of providing an optical fiber having a fiber jacket and an end, removing a predetermined bulk of the fiber jacket from an area adjacent the end while substantially simultaneously cleaning the area by one of moving gas, such as by pulsing, over the area and exhausting gas from the area. The step of removing a predetermined bulk of the fiber jacket from an area adjacent the end may further include the step of directing a cutting beam against the fiber jacket and one of the steps of moving the cutting beam over the area and moving the optical fiber through the cutting beam. Moving the optical fiber through the cutting beam may include at least one of the steps of rotating the optical fiber through the cutting beam and translating the optical fiber through the cutting beam substantially along one of an x-axis, a y-axis and a z-axis. To complete preparation of the optical fiber for fusion splicing, the method may further include the step of ablating the end of the optical fiber substantially normal to its x-axis.

BRIEF DESCRIPTION OF THE DRAWINGS

The foregoing and further and more specific objects and advantages of the instant invention will become readily apparent to those skilled in the art from the following detailed description thereof taken in conjunction with the drawings in which.

BEST MODE FOR CARRYING OUT THE INVENTION

The present invention provides, among other things, a new and improved method of preparing optical fiber for fusion splicing, a new and improved method of fusion splicing segments of optical fiber and a new and improved method of forming a fusion splice. Ensuing embodiments of the present invention are easy and inexpensive to carry out, substantially eliminate fiber optic segment contamination and occasion a long-lasting and rugged fusion splice.

Figure 1:
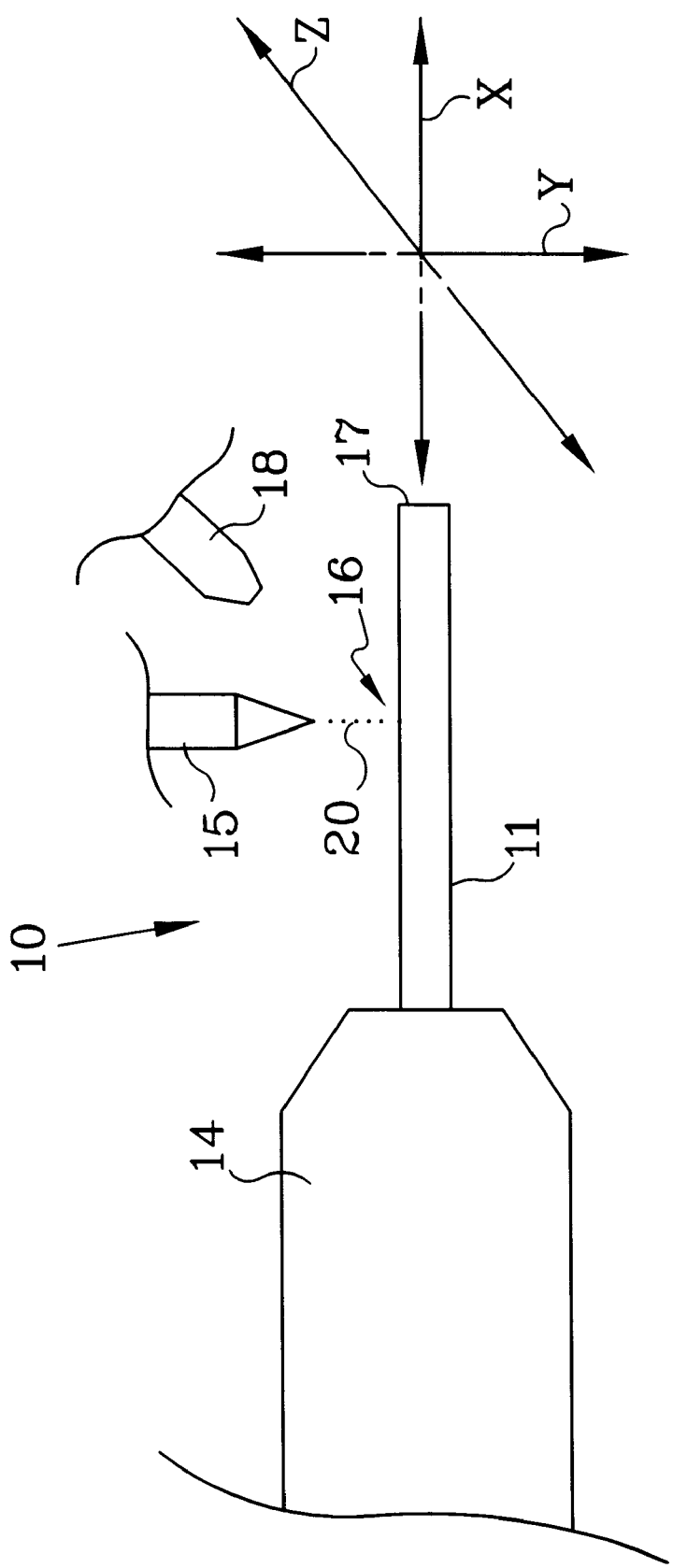
FIG. 1 illustrates a schematic representation of a system for preparing fiber for fusion splicing.
Figure 2:
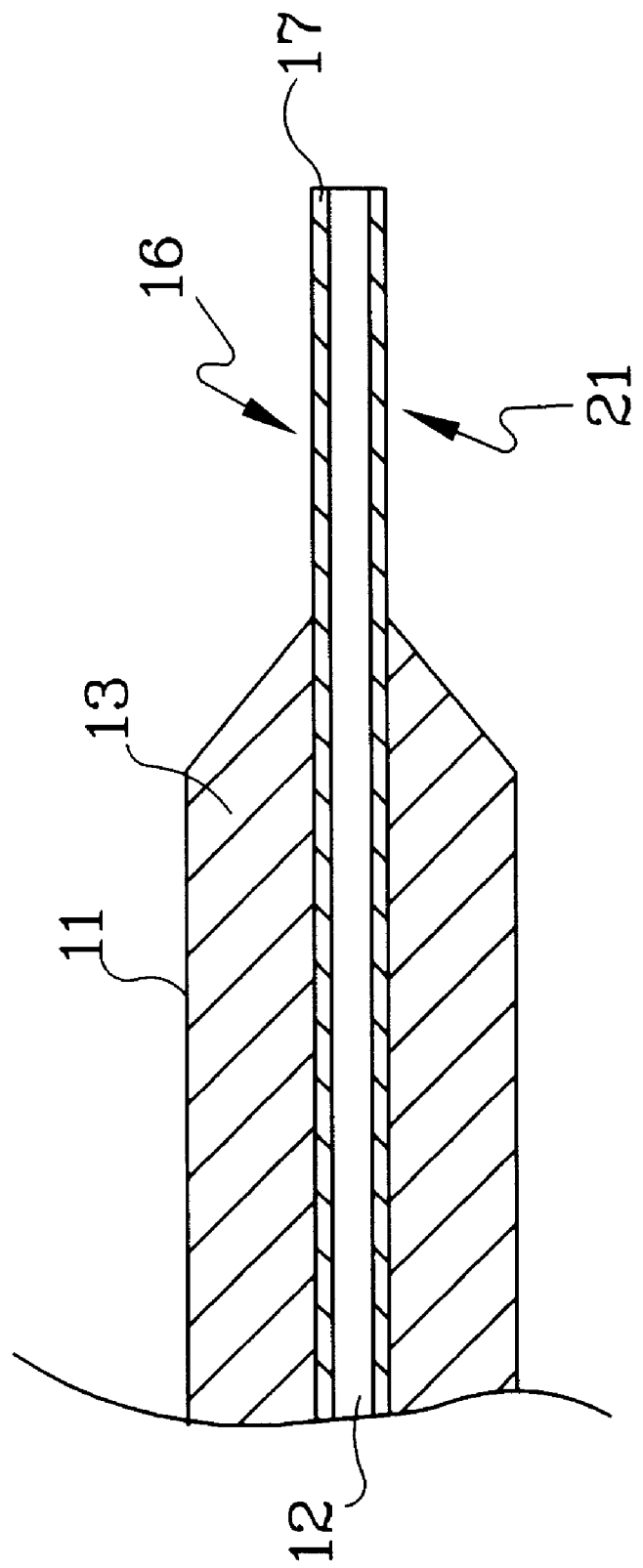
FIG. 2 illustrates a side sectional view of a fiber having a segment stripped of its jacket or coating.

Turning now to the drawings, in which like reference characters indicate corresponding elements throughout the several views, attention is directed to FIG. 1 which illustrates a schematic representation of a system 10 for preparing an optical fiber 11 for fusion splicing, optical fiber 11 including a fiber cladding 12 encapsulated in a fiber jacket or coating 13 as shown substantially in FIG. 2. System 10 is generally comprised of a fixture 14, such as a chuck or the like, cutting apparatus 15 for cutting away portions of fiber jacket 13 at, for instance, an area 16 adjacent an end 17 of optical fiber 10, and a gas source 18 for moving gas over area 16. The gas provided from gas source 18 may be air, a selected inert gas, etc. Furthermore, the gas provided from gas 18 may be delivered to area 16 in one of a continuous stream of gas and pulses of gas if desired. Rather than move gas over area 16 during the process, gas may otherwise be exhausted from the work area with a vacuum apparatus. In this regard, gas source 18 could be provided as a vacuum apparatus.

In a preferred embodiment, cutting apparatus 15 includes an optical system that delivers a laser or cutting beam 20 focused on or against fiber jacket 13, although more than one cutting beam 20 may be used. Beam 20 includes sufficient power density to cut away or ablate fiber jacket 13. In this vein, fixture 14 is operative receiving and holding and, if desired, moving optical fiber 11 into and through beam 20 for one or more of rotation about its x-axis, translation substantially along the x-axis, translation substantially along a y-axis and translation substantially along a z-axis as needed for carrying out a desired cutting operation or otherwise so that beam 20 may operate to remove a predetermined bulk of fiber jacket 13 from fiber cladding 12 to form a segment 21 of exposed fiber cladding 12 as evinced in FIG. 2. Cleaning fiber cladding 12 of residual fiber jacket 13 residue may be accomplished in substantially the same manner as normal cutting operations and by adjusting the power density, wavelength and focus of beam 20 as needed. Additionally, although fiber 11 may be rotated and translated through beam 20 by fixture 14 as needed during the foregoing cutting operation, it may alternatively be held stationary and cutting apparatus 15 rotated and translated over area 16 if so desired.

Cutting apparatus 15 may alternatively be provided as a system including an apparatus for delivering a scanned and focused carbon dioxide laser beam having, for instance, a 10.6 micron wavelength, to remove fiber jacket 13.

During or otherwise substantially simultaneously with the cutting away of a predetermined bulk of fiber jacket 13 with cutting apparatus 15, gas source 18 operates to move or flood air, such as by pulsing, generally over area 16 at the focus point of beam 20 to clean or blow away fiber jacket 13 residue removed during the cutting process. Cleaning of area 16 with gas delivery is important for keeping area 16 clear of unwanted debris during the cutting process and serves as a highly efficient method of cleaning and of substantially reducing fiber cladding 12 contamination. This cleaning process may also be carried out by exhausting gas away from area 16. To complete the preparation of optical fiber 11 for fusion splicing after a predetermined bulk of fiber jacket 13 has been removed to form segment 21 of exposed fiber cladding 12, a portion of segment 21 at or adjacent end 17 is ablated as fixture 14 rotates and translates optical fiber 11 through beam 20 to create a smooth surface substantially square or normal to its x-axis. However, this smooth surface could also be created by a diamond wheel cutter for cleaving portions of the exposed fiber cladding 12. During this ablating step, air may be moved by gas source 18, such as by pulsing, over the ablated area to keep system 10 and optical fiber 11 free of debris. However, optical fiber 11 may be kept free of debris by exhausting air from the ablated area. Although optical fiber 12 may be rotated by fixture 14 during the foregoing ablation operation, it may alternatively be held stationary and cutting apparatus 15 rotated and translated relative optical fiber 11 if so desired. Furthermore, and as previously intimated, a plurality of beams may be incorporated in the foregoing process if so desired.

Figure 3:
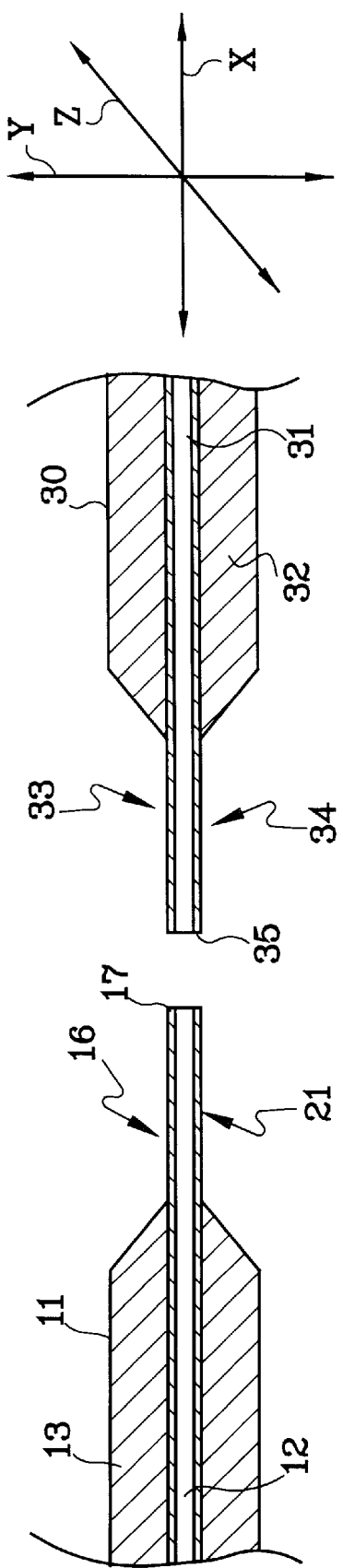
FIG. 3 illustrates a side view of two opposing fibers each having a segment stripped of its jacket or coating.
Figure 4:
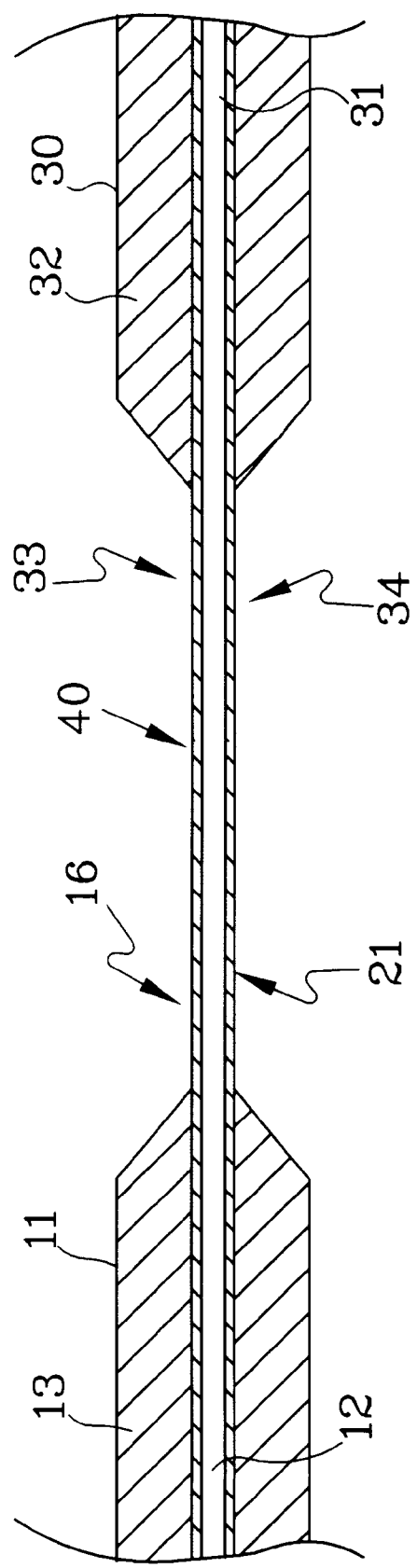
FIG. 4 illustrates a side view of the segments FIG. 4 shown as they would appear joined by fusion.

With fiber 10 prepared in the foregoing manner and ready for fusion splicing as shown in FIG. 3, a second optical fiber 30 may be prepared in substantially the same manner, optical fiber 30 shown having a fiber cladding 31, a fiber jacket 32, an area 33 defining a segment 34 of exposed fiber cladding 31 and an end 35. It should be readily understood that optical fiber 30 includes x-, y- and z- axes as shown in FIG. 3. Ends 17 and 35 of optical fibers 11 and 30, respectively, may then be spatially and, if necessary, azimuthally aligned as shown for a fusion splicing operation each using, for instance, the translation and rotation capabilities of a fixture such as fixture 14. So aligned, ends 17 and 35 may be fusion spliced together as shown in FIG. 4 by a conventional fusion splice operation to form a fusion splice 40. Those having regard toward the relevant art will readily appreciate that upon completion of fusion splice 40, segments 21 and 34 may be re-jacketed with fiber jacket material if so desired.

The present invention has been described above with reference to a preferred embodiment. However, those skilled in the art will recognize that changes and modifications may be made in the described embodiments without departing from the nature and scope of the present invention. Various changes and modifications to the embodiment herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

1. A method of forming a fusion splice, comprising the steps of:
   providing a first optical fiber having a first fiber jacket and a first end, and a second optical fiber having a second fiber jacket and a second end;
   removing a predetermined bulk of the first fiber jacket from a first area adjacent the first end;
   substantially simultaneously cleaning the first area;
   removing a predetermined bulk of the second fiber jacket from a second area adjacent the second end;
   substantially simultaneously cleaning the second area;
   aligning the first end with the second end; and
   fusing the first end with the second end.

2. The method of claim 1, wherein the step of removing a predetermined bulk of the first fiber jacket from a first area adjacent the first end further includes the step of directing one or more cutting beams against the first fiber jacket.

3. The method of claim 2, wherein the step of directing one or more cutting beams against the first fiber jacket further includes the step of moving the one or more cutting beams over the first area.

4. The method of claim 1, wherein the step of removing a predetermined bulk of the first fiber jacket from a first area adjacent the first end further includes the steps of:
   directing one or more cuttings beam against the first fiber jacket; and
   moving the first optical fiber through the one or more cutting beams.

5. The method of claim 4, wherein the step of moving the first optical fiber through the one or more one or more cutting beams further includes the step of rotating the first optical fiber through the one or more one or more cutting beams.

6. The method of claim 5, wherein the step of rotating the first optical fiber through the one or more cutting beams further includes the steps of:
   mounting the first optical fiber with a fixture; and
   rotating the fixture.

7. The method of claim 4, wherein the step of moving the first optical fiber through the one or more cutting beams further includes the step of translating the first optical fiber through the one or more cutting beams.

8. The method of claim 7, wherein the step of translating the first optical fiber through the one or more cutting beams further includes the steps of:

mounting the first optical fiber with a fixture; and translating the fixture substantially along one or more of an x-axis, a y-axis and a z-axis.

9. The method of claim 1, the first optical fiber further including an axis, wherein the step of removing a predetermined bulk of the first fiber jacket from a first area adjacent the first end further includes the step of ablating the first end substantially normal to the axis.

10. The method of claim 1, wherein the step of removing a predetermined bulk of the second fiber jacket from a second area adjacent the second end further includes the step of directing one or more cutting beams against the second fiber jacket.

11. The method of claim 10, wherein the step of directing one or more cutting beams against the second fiber jacket further includes the step of moving the one or more cutting beams over the second area.

12. The method of claim 10, wherein the step of removing a predetermined bulk of the second fiber jacket from a second area adjacent the second end further includes the steps of:

directing one or more cutting beams against the second fiber jacket; and moving the second optical fiber through the one or more cutting beams.

13. The method of claim 12, wherein the step of moving the second optical fiber through the one or more cutting beams further includes the step of rotating the second optical fiber through the one or more cutting beams.

14. The method of claim 13, wherein the step of rotating the second optical fiber through the one or more cutting beams further includes the steps of:

mounting the second optical fiber with a fixture; and rotating the fixture.

15. The method of claim 12, wherein the step of moving the second optical fiber through the one or more cutting beams further includes the step of translating the second optical fiber through the one or more cutting beams.

16. The method of claim 15, wherein the step of translating the second optical fiber through the one or more cutting beams further includes the steps of:

mounting the second optical fiber with a fixture; and translating the fixture substantially along one or more of an x-axis, a y-axis and a z-axis.

17. The method of claim 10, the second optical fiber further including an axis, wherein the step of removing a predetermined bulk of the second fiber jacket from a second area adjacent the second end further includes the step of ablating the second end substantially normal to the axis.

18. The method of claim 1, wherein the step of substantially simultaneously cleaning the first area further includes at least one of the steps of substantially simultaneously moving gas over the first area and exhausting gas from the first area.

19. The method of claim 1, wherein the step of substantially simultaneously cleaning the second area further includes at least one of the steps of substantially simultaneously moving gas over the first area and exhausting gas from the first area.

20. A method of preparing an optical fiber for fusion splicing, comprising the steps of:

providing an optical fiber having a fiber jacket and an end;

removing a predetermined bulk of the fiber jacket from an area adjacent the end; and substantially simultaneously cleaning the area.

21. The method of claim 20, wherein the step of removing a predetermined bulk of the fiber jacket from an area adjacent the end further includes the step of directing one or more cutting beams against the fiber jacket.

22. The method of claim 21, wherein the step of directing one or more cutting beams against the fiber jacket further includes the step of moving the one or more cutting beams over the area.

23. The method of claim 20, wherein the step of removing a predetermined bulk of the fiber jacket from an area adjacent the end further includes the steps of:

directing one or more cutting beams against the fiber jacket; and moving the optical fiber through the one or more cutting beams.

24. The method of claim 23, wherein the step of moving the optical fiber through the one or more cutting beams further includes the step of rotating the optical fiber through the one or more cutting beams.

25. The method of claim 24, wherein the step of rotating the optical fiber through the one or more cutting beams further includes the steps of:

mounting the optical fiber with a fixture; and rotating the fixture.

26. The method of claim 23, wherein the step of moving the optical fiber through the one or more cutting beams further includes the step of translating the optical fiber through the one or more cutting beams.

27. The method of claim 26, wherein the step of translating the optical fiber through the one or more cutting beams further includes the steps of:

mounting the optical fiber with a fixture; and translating the fixture substantially along one or more of an x-axis, a y-axis and a z-axis.

28. The method of claim 20, the optical fiber further including an axis, wherein the step of removing a predetermined bulk of the fiber jacket from an area adjacent the end further includes the step of ablating the end substantially normal to the axis.

29. The method of claim 20, wherein the step of substantially simultaneously cleaning the area further includes at least one of the steps of substantially simultaneously moving gas over the area and exhausting gas from the area.

* * * * *